(12) United States Patent
Yoon et al.

(10) Patent No.: US 9,049,383 B2
(45) Date of Patent: Jun. 2, 2015

(54) METHOD AND APPARATUS FOR DISPLAYING PHOTO ON SCREEN HAVING ANY SHAPE

(75) Inventors: Seung-hyun Yoon, Anyang-si (KR); Moon-sang Lee, Yongin-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 13/294,581

(22) Filed: Nov. 11, 2011

(65) Prior Publication Data
US 2012/0249576 A1 Oct. 4, 2012

(30) Foreign Application Priority Data

Mar. 30, 2011 (KR) .................. 10-2011-0029034

(51) Int. Cl.
*H04N 5/262* (2006.01)
*H04N 5/232* (2006.01)

(52) U.S. Cl.
CPC ......... *H04N 5/2628* (2013.01); *H04N 5/23212* (2013.01); *G09G 2340/0407* (2013.01)

(58) Field of Classification Search
CPC ............... G09G 2340/125; G09G 2340/0407; G06T 3/40; G06T 3/4038; G06F 3/0488; G06F 8/34; H04N 5/23212
USPC ............. 345/173, 1.1, 660, 638; 40/539; 715/771; 382/284; 348/347
See application file for complete search history.

(56) References Cited

U.S. PATENT DOCUMENTS

| | | | | |
|---|---|---|---|---|
| 5,083,389 | A  * | 1/1992 | Alperin | 40/539 |
| 2003/0034934 | A1* | 2/2003 | Brewer | 345/1.1 |
| 2009/0027381 | A1* | 1/2009 | Lee | 345/419 |
| 2009/0225216 | A1* | 9/2009 | Yun | 348/347 |
| 2009/0309897 | A1* | 12/2009 | Morita et al. | 345/660 |
| 2010/0020026 | A1* | 1/2010 | Benko et al. | 345/173 |
| 2011/0105192 | A1* | 5/2011 | Jung et al. | 345/173 |
| 2011/0157228 | A1* | 6/2011 | Ptucha et al. | 345/638 |
| 2011/0200273 | A1* | 8/2011 | Singhal et al. | 382/284 |
| 2012/0069131 | A1* | 3/2012 | Abelow | 348/14.01 |
| 2012/0110491 | A1* | 5/2012 | Cheung | 715/771 |

OTHER PUBLICATIONS

Microsoft Publisher, "Watch your pictures take shape: Insert a picture into an AutoShape in your publication", p. 1, Aug. 2010, http://office.microsoft.com.*
Microsoft Publisher, "Add pictures and other graphics", p. 1, Aug. 2010, http://office.microsoft.com.*

* cited by examiner

*Primary Examiner* — Chante Harrison
(74) *Attorney, Agent, or Firm* — Sughrue Mion, PLLC

(57) ABSTRACT

Provided are a method and an apparatus for displaying a photo on a screen having any shape. The method includes: extracting photographing information about a photo having a first shape; adjusting the photo for display with a shape optimized for a screen having a second shape, based on the extracted photographing information; and displaying the adjusted photo on the screen.

24 Claims, 8 Drawing Sheets

METHOD AND APPARATUS FOR DISPLAYING PHOTO ON SCREEN HAVING ANY SHAPE

CROSS-REFERENCE TO RELATED PATENT APPLICATION

This application claims priority from Korean Patent Application No. 10-2011-0029034, filed on Mar. 30, 2011 in the Korean Intellectual Property Office, the disclosure of which is incorporated herein in its entirety by reference.

BACKGROUND

1. Field

Apparatuses and methods consistent with exemplary embodiments relate to displaying a photo on a screen having any shape, and more particularly, to displaying a photo optimized to a screen having any shape by using photographing information contained in a photo file.

2. Description of the Related Art

Related art display devices generally have rectangular shapes. Accordingly, it is not difficult to display a photo stored in a tetragonal shape on a tetragonal display device using a digital photographing device, such as a digital camera. However, it is difficult to display such a photo having a tetragonal shape on a display device having a predetermined shape other than a tetragonal shape. For example, in order to display a related art tetragonal image on a circular screen, a tetragonal image inscribed in a circle is displayed or a zoomed in image is displayed. At this time, suitable display shapes are considered according to characteristics of an image.

SUMMARY

Aspects of one or more exemplary embodiments provide a method and apparatus for displaying a photo optimized to a screen having any shape by using photographing information contained in a photo file, and a computer readable recording medium having recorded thereon a program for executing the method.

According to an aspect of an exemplary embodiment, there is provided a method of displaying a photo on a screen, the method including: extracting photographing information about a photo having a first shape; adjusting the photo for display with a shape optimized for a screen having a second shape, based on the extracted photographing information; and displaying the adjusted photo on the screen.

The extracting of the photographing information may include: generating a digital photo file from the photo having the first shape by using a digital photographing device, and storing the generated digital photo file; and obtaining photographing information contained in the digital photo file.

The photographing information may include at least one of lens information, focal length information, and focus information, and the adjusting of the photo may include: determining whether the photo is a short range photo based on the extracted photographing information; and determining a region having the focus information in the photo.

The determining of whether the photo is the short range photo may include determining that the photo is a long range photo if the focus information is distributed throughout the photo, and determining that the photo is the short range photo if the focus information is limited to a partial region of the photo.

The determining of whether the photo is the short range photo may include determining whether the photo is the short range photo by using information about a lens used while taking the photo, and a view angle determined according to focal length information of the photo.

The adjusting of the photo may include adjusting the photo to be displayed throughout the screen if the photo is a long range photo.

The adjusting of the photo may include zooming in the photo so that a region containing the focus information in the photo is located in a center of the screen, if the photo is the short range photo according to the determining.

The adjusting of the photo may include, if the photo is displayed while being inscribed in the screen, filling a remaining portion of the screen excluding the photo with an image obtained by copying at least a part of the photo.

The filling of the remaining portion may include filling the remaining portion with a background identical to a peripheral portion of the photo.

The screen may be an image viewing region having any shape in a display device.

According to an aspect of another exemplary embodiment, there is provided an apparatus for displaying a photo on a screen, the apparatus including: an image extractor which extracts photographing information about a photo having a first shape; an image processor which adjusts the photo for display with a shape optimized for a screen having a second shape, based on the extracted photographing information; and a displayer which displays the adjusted photo on the screen.

The apparatus may further include a storage unit which generates a digital photo file from the photo having the first shape by using a digital photographing device, and stores the generated digital photo file, wherein the image extractor may obtain photographing information contained in the digital photo file.

The photographing information may include at least one of lens information, focal length information, and focus information, and the image processor may determine whether the photo is a short range photo based on the photographing information, and determine a region having the focus information in the photo.

The image processor may determine that the photo is a long range photo if the focus information is distributed throughout the photo, and determine that the photo is the short range photo if the focus information is limited to a partial region of the photo.

The image processor may determine whether the photo is the short range photo by using information about a lens used while taking the photo, and a view angle determined according to focal length information of the photo.

The image processor may adjust the photo to be displayed throughout the screen if the photo is a long range photo.

The image processor may zoom in the photo so that a region containing the focus information in the photo is located in a center of the screen, if the photo is the short range photo according to the determining.

The image processor, if the photo is displayed while being inscribed in the screen, may fill a remaining portion of the screen excluding the photo with an image obtained by copying at least a part of the photo.

The image processor may fill the remaining portion with a background identical to a peripheral portion of the photo.

The screen may be an image viewing region having any shape in the displayer.

According to an aspect of another exemplary embodiment, there is provided a computer readable recording medium having recorded thereon a program for executing the method.

According to an aspect of another exemplary embodiment, there is provided an apparatus for processing a photo for display on a screen, the apparatus including: a determiner which determines photographing information about a photo having a first shape; an image processor which adjusts the photo for display with a shape optimized for a screen having a second shape, based on the determined photographing information; and an output unit which outputs the adjusted photo.

BRIEF DESCRIPTION OF THE DRAWINGS

The above and other features and advantages will become more apparent by describing in detail exemplary embodiments with reference to the attached drawings in which.

DETAILED DESCRIPTION OF EXEMPLARY EMBODIMENTS

Figure 1:
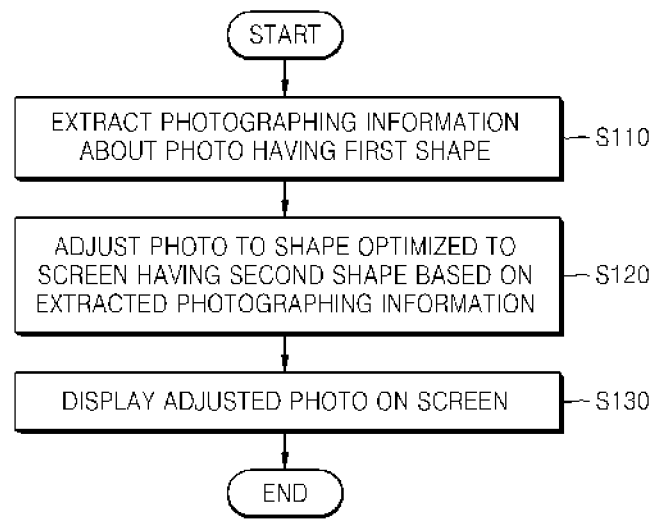
FIG. 1 is a flowchart schematically illustrating a method of displaying a photo on a screen having any shape, according to an exemplary embodiment.

Hereinafter, exemplary embodiments will be described more fully with reference to the accompanying drawings. Exemplary embodiments may, however, be embodied in many different forms and should not be construed as being limited to the exemplary embodiments set forth herein; rather, these exemplary embodiments are provided so that this disclosure will be thorough and complete, and will fully convey the inventive concept to those skilled in the art. In the drawings, like reference numerals denote like elements. Hereinafter, expressions such as "at least one of," when preceding a list of elements, modify the entire list of elements and do not modify the individual elements of the list.

First, core ideas of one or more exemplary embodiment will be schematically described with reference to FIG. 1.

FIG. 1 is a flowchart schematically illustrating a method of displaying a photo on a screen having any shape, according to an exemplary embodiment.

Referring to FIG. 1, a photo having a first shape is obtained by using a digital photographing device, and photographing information about the obtained photo having the first shape is extracted in operation S110.

Here, the digital photographing device may be an image processing apparatus, such as a digital camera, a personal digital assistant (PDA), a personal multimedia player (PMP), a mobile device, a tablet device, a computer, etc.

The photographing information may be read from a digital photo file corresponding to the photo obtained by the digital photographing device, and may include at least one of camera information, lens information, focal length information, and focus information.

An intention of a photographer is determined based on the extracted photographing information, and the photo is adjusted to a shape optimized to a screen having a second shape in operation S120.

Here, the second shape denotes any shape different from the first shape. For example, the first shape may be tetragonal and the second shape may be circular, but the first and second shapes are not limited thereto in other exemplary embodiments.

Also, the intention of the photographer may be determined to determine whether the digital photo file is related to a person, an object, a scenery, a focus object, a short range, or a long range.

The adjusted photo is displayed on the screen having the second shape in operation S130.

In summary, according to the current exemplary embodiment, an intention of a photographer is determined by using photographing information contained in a digital photo file or an image file, and then a tetragonal photo may be displayed after being optimized to a screen having any shape.

The present exemplary embodiment and other exemplary embodiments may be applied to all products capable of displaying an image, such as a screen having any shape, a circular electronic frame, a television (TV), a mobile phone, a computer, a mobile device, a tablet device, etc.

As a result, a value of a device may be increased by giving a user a photo viewing experience different from a related art technology by using a screen having a circular shape or the like, instead of a tetragonal screen.

In addition, the method according to the present exemplary embodiment can solve the problems described hereinafter with reference to FIGS. 2A and 2B.

Figure 2A:
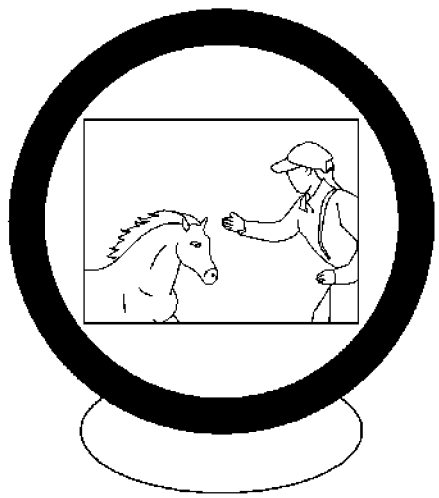
FIGS. 2A and 2B are diagrams for describing related art methods of displaying a tetragonal image on a circular screen without considering photographing information.
Figure 2B:
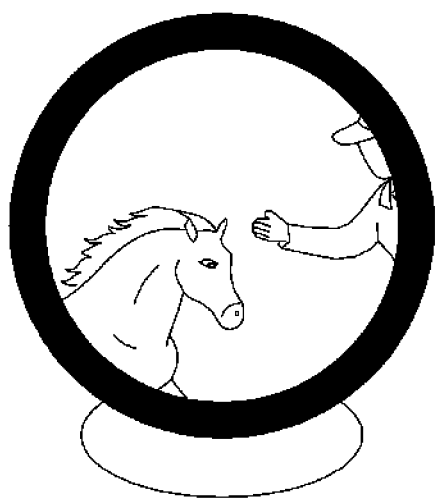

FIGS. 2A and 2B are diagrams for describing related art methods of displaying a tetragonal image on a circular screen without considering photographing information. In other words, in FIGS. 2A and 2B, the related art methods display an image on a screen having any shape without determining an intention of a photographer by using photographing information.

Referring to FIG. 2A, a tetragonal photo is inscribed in a circular screen even though the tetragonal photo is a photo of a person. In other words, according to the related art method, the inscribed tetragonal image is displayed on the circular screen in a way that does not take advantage of the circular screen. Also, an empty region that is not filled by the photo is generated in the circular screen.

In FIG. 2B, in order to remove such an empty region, the tetragonal photo is zoomed in to use all regions of the circular screen.

However, according to such a related art method, all pieces of information contained in the tetragonal photo are not displayed, and thus there may be data loss of important information for a user. Here, a region of the tetragonal photo containing important information may be determined based on focus information obtained when the user takes the photo with a digital photographing device.

However, according to the related art method illustrated in FIG. 2B, data of person information constituting important information included in the tetragonal photo is lost.

The empty region and data loss of FIGS. 2A and 2B may be resolved by frequently receiving an input about an intention of the user. However, such frequent inputs may inconvenience the user, specifically if a consumer electronic (CE) device for receiving the inputs is spaced apart from the user.

Methods of displaying a photo optimized to a screen having any shape by using photographing information according to one or more exemplary embodiments will now be described in detail with reference to FIGS. 3 through 11.

Figure 3:
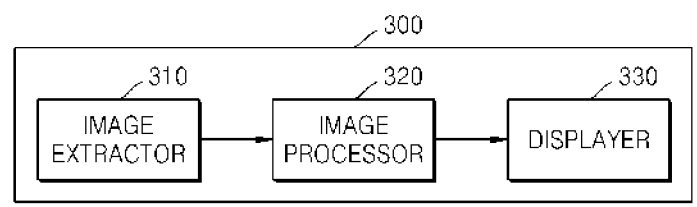
FIG. 3 is a block diagram schematically illustrating an apparatus for displaying a photo on a screen having any shape, according to an exemplary embodiment.

FIG. 3 is a block diagram schematically illustrating an apparatus 300 for displaying a photo on a screen having any shape, according to an exemplary embodiment.

Referring to FIG. 3, the apparatus 300 includes an image extractor 310 for extracting photographing information about a photo having a first shape, an image processor 320 for adjusting the photo to a shape optimized to a screen having a second shape, based on the extracted photographing information, and a displayer 330 for displaying the adjusted photo on the screen. The apparatus 300 may further include a storage unit (not shown) for storing the photo having the first shape by using a digital photographing device. It is understood that one or more other exemplary embodiments are not limited to the above-described elements. For example, an apparatus according to another exemplary embodiment may be a processing apparatus which processes a photo and outputs, through an output unit (not shown), the processed photo to be displayed on one or more external display devices. In this case, information regarding a screen of an external display device may be received from the display device, may be input by a user, etc.

In the current exemplary embodiment, each of elements may be formed on an individual chip or at least two elements may be formed on a single chip.

The image extractor 310 may read the photo to be displayed on the displayer 330 from the storage unit.

The image extractor 320 may extract the photographing information from the photo. For example, the image extractor 310 may read focus information obtained when a user took the photo, from the photo. Also, the image extractor 310 may read lens information used when the user took the photo, and focal length information of the photo, from the photo. However, it is understood that one or more other exemplary embodiments are not limited to the above construction. For example, according to another exemplary embodiment, the photographing information may be determined from a separate file or information, separate from the photo.

The image processor 320 may determine whether the photo is a short range photo, based on the photographing information. Also, the image processor 320 may determine an important region containing the focus information in the photo.

The image processor 320 may use the focus information while determining whether the photo is a short range photo. For example, the image processor 320 determines that the photo is a long range photo if the focus information is distributed throughout the photo, and determines that the photo is a short range photo if the focus information is limited to a partial region of the photo.

Alternatively, the image processor 320 may determine whether the photo is a short range photo by using the lens information and the focal length information. A detailed description of a correlation between a focal length and a view angle will now be provided with reference to FIG. 4.

Figure 4:
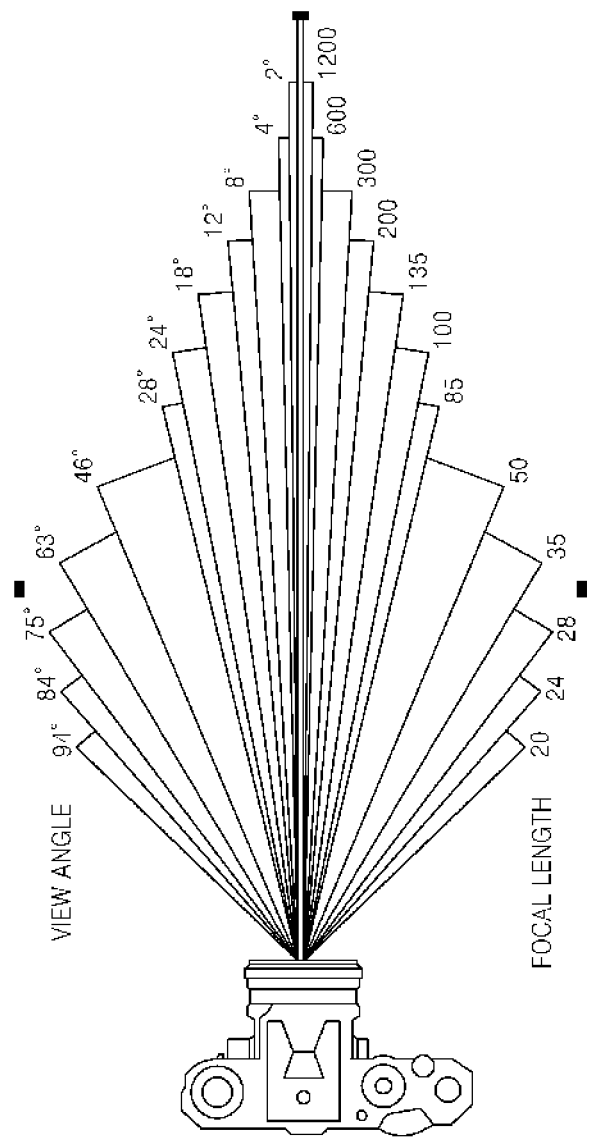
FIG. 4 is a diagram for describing a correlation between a focal length and a view angle.

By using the correlation shown in FIG. 4, a view angle determined according to a certain focal length is obtained, and thus it may be determined whether a user photographed a close subject, such as a person, or a far off subject, such as scenery, by using the photographing information obtained from the photo.

For example, if the user used a 18 to 55 mm lens, it may be determined that the user tried to photograph a near object if a focal length is close to 55 mm, and far scenery if the focal length is close to 18 mm.

The intention of the user may be more accurately determined by using the lens information and the focus information together. As such, it is determined whether the photo is a short range photo or a long range photo, and the important region in the photo is determined accordingly.

Referring back to FIG. 3, if the photo is a long range photo, the image processor 320 adjusts the photo to be displayed throughout the screen.

On the other hand, if the photo is a short range photo, the image processor 320 may zoom in the important region of the photo containing the focus information so that the important region is disposed in a center of the screen.

The displayer 330 displays the photo adjusted by the image processor 320 on the screen.

Figure 5:
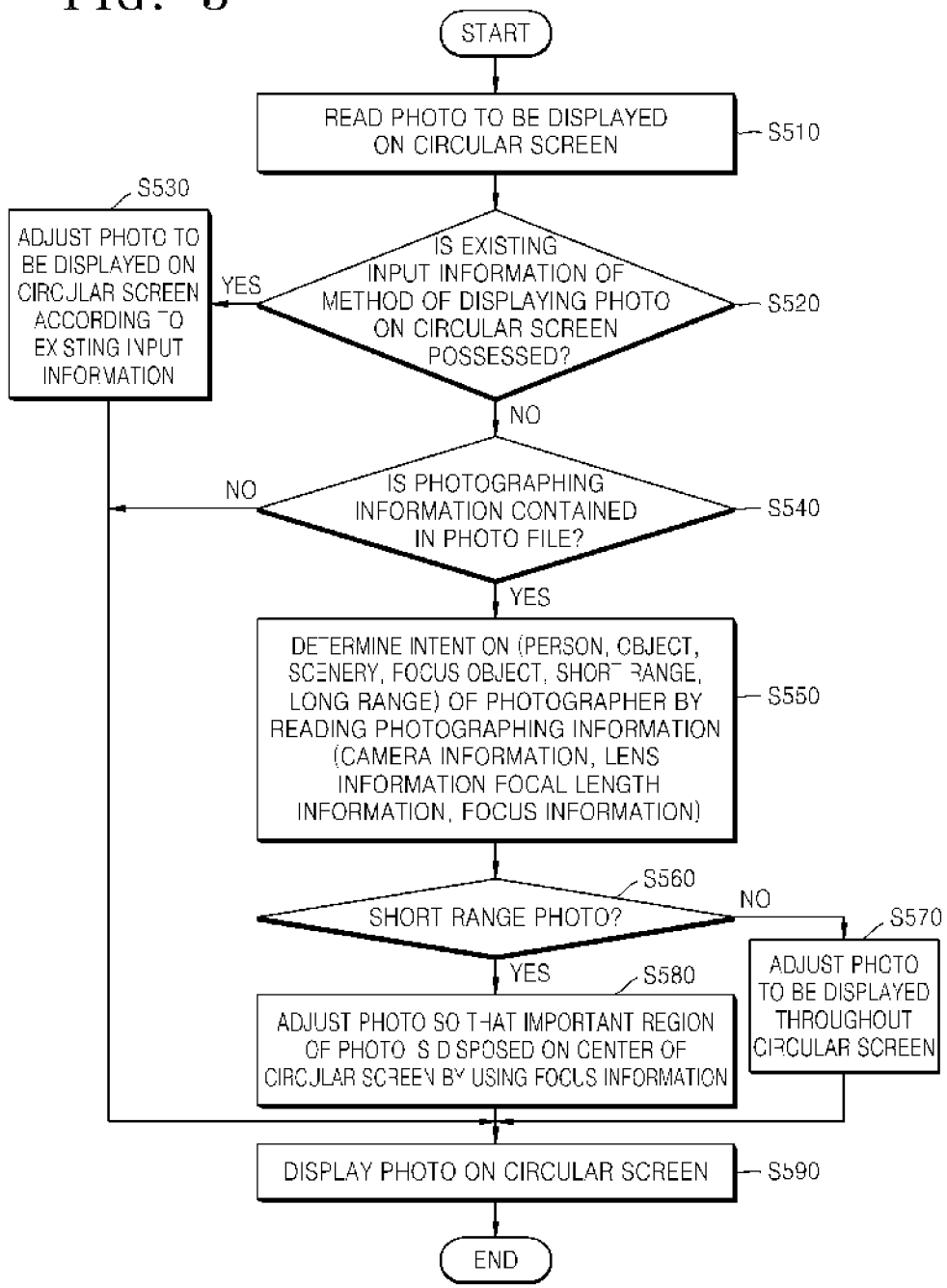
FIG. 5 is a flowchart illustrating in detail a method of displaying a photo on a screen having any shape, according to an exemplary embodiment.

FIG. 5 is a flowchart illustrating in detail a method of displaying a photo on a screen having any shape, according to an exemplary embodiment.

For convenience of description, the screen according to the present exemplary embodiment has a circular shape, though it is understood that the screen may have any shape, such as a tetragonal shape, a triangular shape, a hexagonal shape, etc., according to one or more other exemplary embodiments.

In operation 510, the image extractor 310 reads a photo to be displayed on a circular screen from the storage unit.

In operation 520, the image processor 320 determines whether existing input information from a user about a method of displaying the photo on the circular screen is possessed (i.e., received or stored).

If the existing input information is possessed, the image processor 320 adjusts the photo to be displayed on the circular screen according to the existing input information in operation S530.

On the other hand, if the existing input information is not possessed, the image processor 320 determines whether a photo file corresponds to the photo contains photographing information in operation S540.

If the photo file contains the photographing information, the image processor 320 determines (e.g., predicts) an intention of a photographer by reading the photographing information in operation S550.

If it is determined that the photographer intended to take a long range photo in operation S560, the image processor 320 displays the photo throughout the circular screen in operation S570.

On the other hand, if it is determined that the photographer intended to take a short range photo in operation S560, the image processor 320 adjusts the photo so that an important region of the photo is disposed on a center of the circular screen by using focus information in operation S580.

As such, the image processor 320 adjusts the photo to a shape optimized to the circular screen (operations S530, S570, and S580), and the displayer 330 displays the adjusted photo on the circular screen in operation S590.

Figure 6:
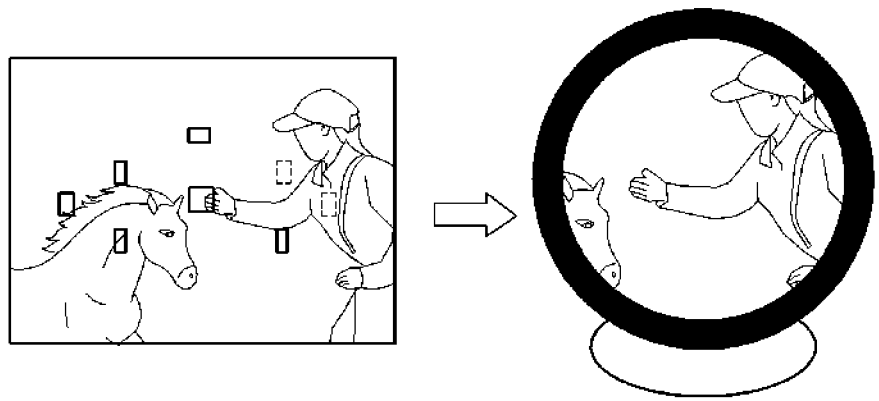
FIGS. 6 through 8 are diagrams for describing methods of displaying a photo on a screen having any shape, according to an exemplary embodiment.
Figure 7:
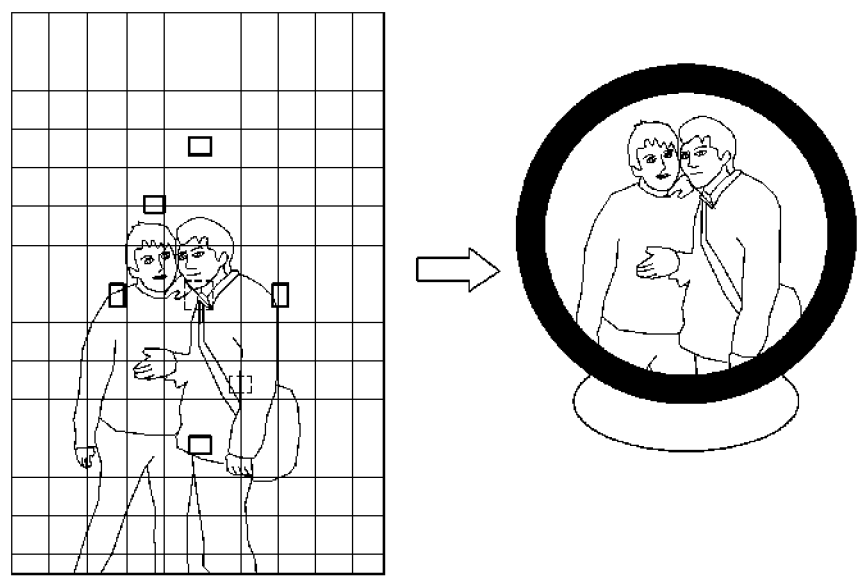
Figure 8:
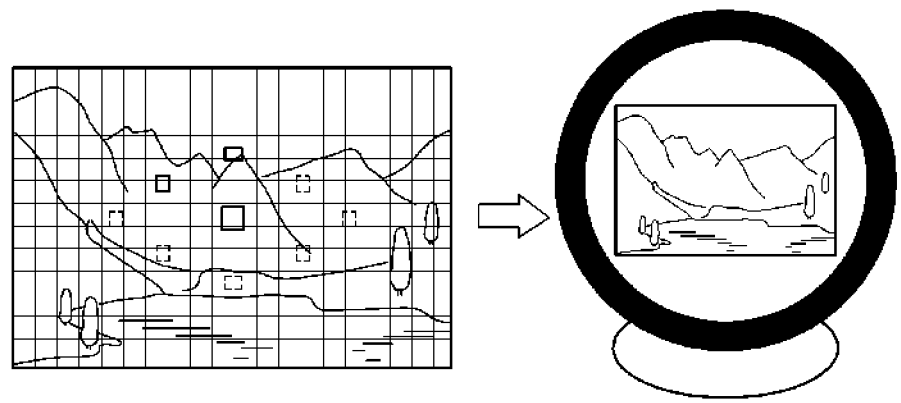

FIGS. 6 through 8 are diagrams for describing methods of displaying a photo on a screen having any shape, according to one or more exemplary embodiments. In FIGS. 6 through 8, important information, e.g., focus information obtained when a user takes a photo, is displayed in dotted lines.

Referring to FIG. 6, the image processor 320 determines that the user photographed a subject in a short range and important information of the photo is in a right region by analyzing data in a photo file (or an image file).

Accordingly, the image processor 320 zooms the photo in so that the right region is disposed on the center of the circular screen.

Meanwhile, referring to FIG. 7, the image processor 320 determines that the user photographed a subject in a long range and important information of the photo is in a center and a right bottom region by analyzing data in a photo file.

Accordingly, the image processor 320 zooms the photo in so that the center and the right bottom region of the photo are disposed on the center of the circular screen.

Meanwhile, referring to FIG. 8, the image processor 320 determines that the user photographed a subject in a long range and important information of the photo is throughout the photo by analyzing data in a photo file.

Accordingly, the image processor 320 displays the photo throughout the circular screen instead of zooming the photo in, if it is determined that the photo is about scenery instead of a person based on photographing information.

As described with reference to FIGS. 6 through 8, the method and the apparatus 300 according to one or more exemplary embodiments may be used in a display device having a shape different from that of a photo. However, the method and the apparatus 300 may also be used in a display device having the same shape as that of a photo.

In other words, the method and the apparatus 300 may be used to display a photo in a related art display device by preparing a screen having any shape.

In other words, a screen described in the specification denotes an image viewing region having any shape in a display device.

Figure 9A:
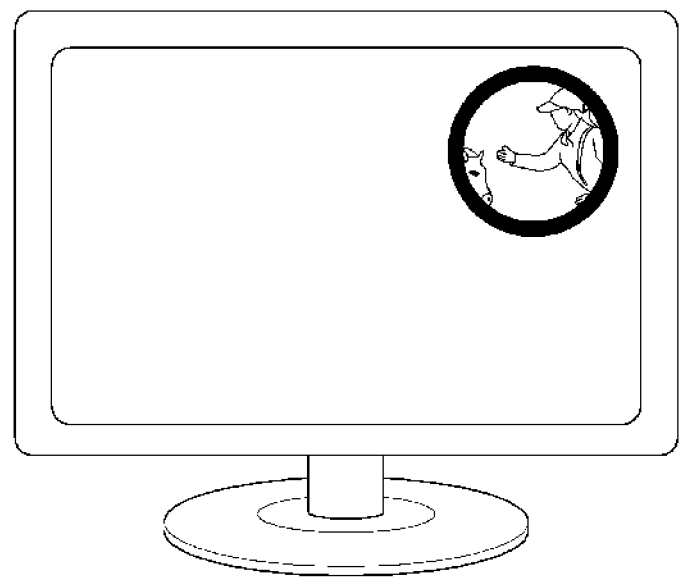
FIGS. 9A through 9C are diagrams for describing methods of displaying a photo on a screen having any shape, according to another exemplary embodiment.
Figure 9B:
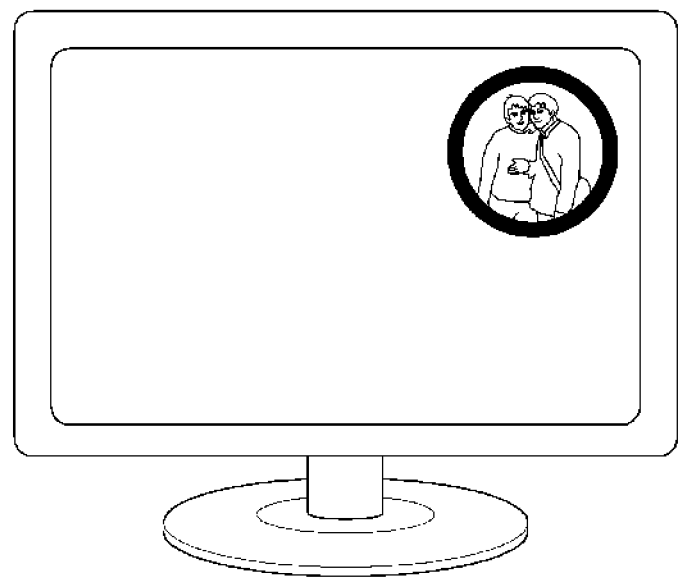
Figure 9C:
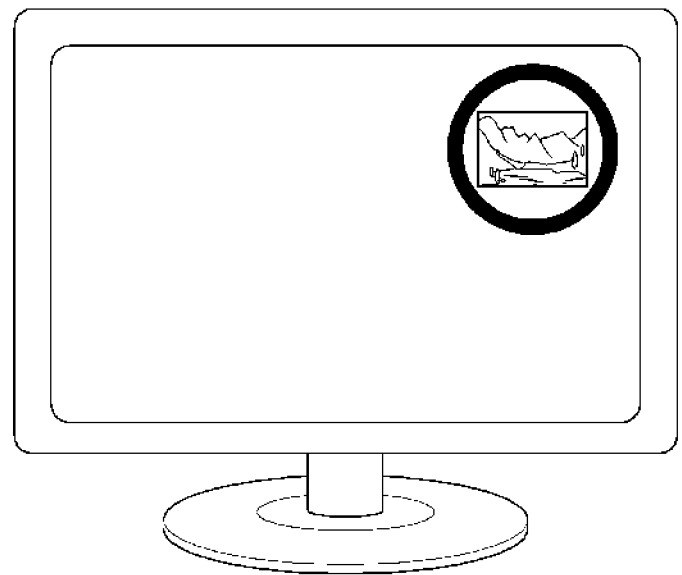

FIGS. 9A through 9C are diagrams for describing methods of displaying a photo on a screen having any shape, according to another exemplary embodiment.

Referring to FIGS. 9A through 9C, when a circular region is used as an image viewing region in a related art tetragonal display device, the apparatus 300 displays an image optimized to the image viewing region by using, for example, any of the methods described with reference to FIGS. 6 through 8.

Since the photographing information and the methods of displaying a photo according to the photographing information of FIGS. 9A through 9C are respectively identical or similar to those of FIGS. 6 through 8, except that a tetragonal display device is used in FIGS. 9A through 9C and a circular display device is used in FIGS. 6 through 8, detailed descriptions thereof will not be repeated herein.

Figure 10:
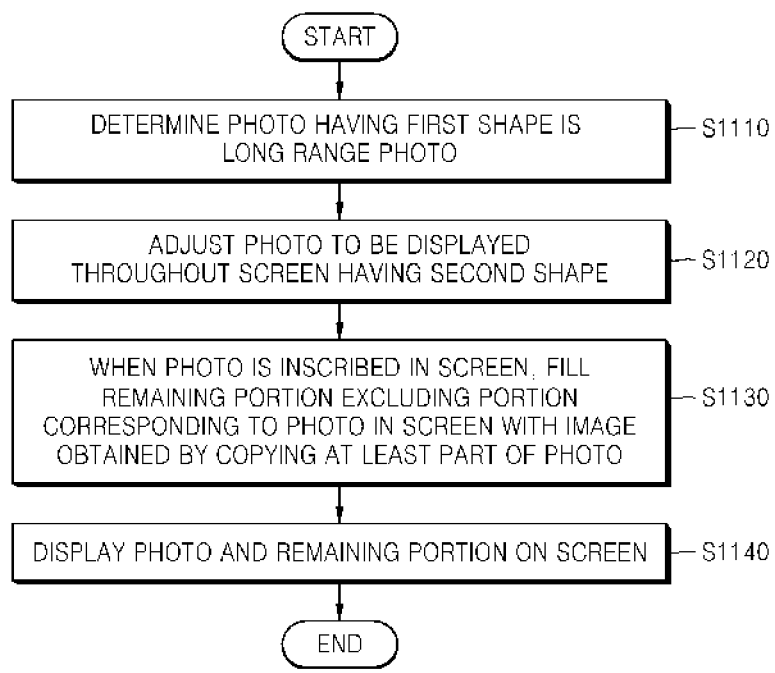
FIG. 10 is a flowchart schematically illustrating a method of displaying a photo on a screen having any shape, according to another exemplary embodiment.

FIG. 10 is a flowchart schematically illustrating a method of displaying a photo on a screen having any shape, according to another exemplary embodiment.

Referring to FIG. 10, the image processor 320 determines that a photo having a first shape is a long range photo based on photographing information in operation S1110. A method of determining a long range photo according to the present exemplary embodiment may be the same as or similar to the method described with reference to FIGS. 3 through 5.

In operation 1120, the image processor 320 adjusts the photo to be displayed throughout a screen having a second shape.

Here, an empty region may be generated in the screen as the photo is inscribed in the screen. Accordingly, the image processor 320 fills a remaining portion excluding a portion corresponding to the photo in the screen with an image obtained by copying at least a part of the photo in operation S1130. In other words, the image processor 320 copies original information of the photo to the remaining portion without losing the original information.

The displayer 330 displays the photo and the remaining portion filled with the copied image on the screen in operation S1140.

Figure 11:
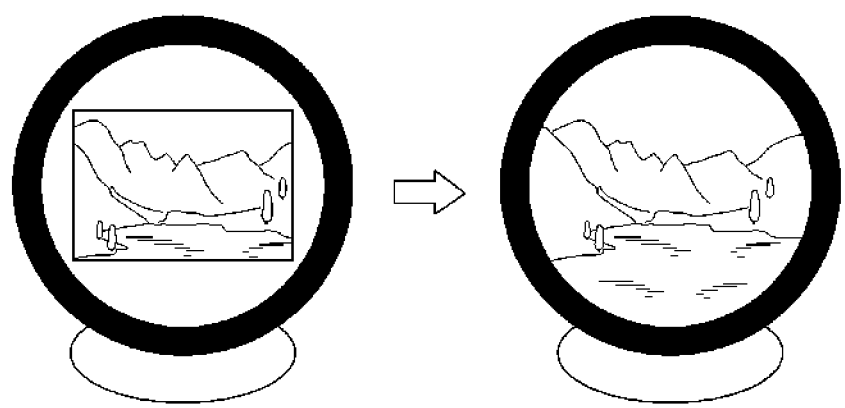
FIG. 11 is a diagram for describing a method of displaying a photo on a screen having any shape, according to another exemplary embodiment.

FIG. 11 is a diagram for describing a method of displaying a photo on a screen having any shape, according to another exemplary embodiment. A circular screen is shown in FIG. 11, but the method may be applied to a screen having any shape, such as a tetragonal screen, a triangular screen, a hexagonal screen, etc. Also, the method of the current exemplary embodiment may be used to display an image optimized to a region having any shape when the region is used as an image viewing region in a related art tetragonal display device.

Referring to FIG. 11, the image processor 320 determines that a user photographed a subject in a long range and important information of the photo is throughout the photo by analyzing data in a photo file corresponding to the photo.

Here, if it is determined that the photo taken by the user is of scenery instead of a person based on photographing information, the image processor 320 displays the photo on the screen by showing an entire region of the photo, instead of zooming the photo in.

When the scenery is inscribed in the circular screen, an empty region may be generated in the circular screen. Thus, the image processor 320 may fill the empty region with a background identical to a peripheral portion of the photo via an image process.

One or more exemplary embodiments can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, etc. The computer readable recording medium can also be distributed over network coupled computer systems so that the computer readable code is stored and executed in a distributed fashion. Also, functional programs, codes, and code segments for accomplishing an exemplary embodiment can be easily construed by programmers skilled in the art to which the exemplary embodiment pertains.

While exemplary embodiments have been particularly shown and described above, it will be understood by those skilled in the art that various changes in form and details may be made therein without departing from the spirit and scope of the inventive concept as defined by the appended claims. The exemplary embodiments should be considered in descriptive sense only and not for purposes of limitation. Therefore, the scope of the inventive concept is defined not by the detailed description of exemplary embodiments, but by the appended claims, and all differences within the scope will be construed as being included in the present invention.

What is claimed is:

1. A method of processing a photo for display on a screen of a display device, the method comprising:
   determining photographing information about an individual photo having a first shape, wherein the photographing information comprises information for determining an important region in the individual photo, wherein the photographing information comprises at least one of lens information, focal length information, and focus information;
   determining whether the photo is a short range photo based on the photographing information;
   automatically adjusting, by an image processor, the individual photo for display with a shape corresponding to a screen having a second shape so as to display the important region in the screen, based on the determined photographing information and whether the photo is a short range photo, wherein the second shape is different from the first shape, and if the first shape is rectangular, then the second shape is not rectangular; and outputting the adjusted photo.

2. The method of claim 1, wherein the determining of the photographing information comprises obtaining the photographing information from a digital photo file corresponding to the photo having the first shape.

3. The method of claim 2, wherein the determining of the photographing information further comprises generating, using a digital photographing device, the digital photo file from the photo having the first shape, and storing the generated digital photo file.

4. The method of claim 1, wherein the determining of whether the photo is the short range photo comprises:
determining a region having the focus information in the photo; and
determining whether the photo is the short range photo based on the determined region.

5. The method of claim 4, wherein the determining of whether the photo is the short range photo based on the determined region comprises determining that the photo is a long range photo if the focus information is distributed throughout the photo, and determining that the photo is the short range photo if the focus information is limited to a partial region of the photo.

6. The method of claim 1, wherein:
the determining of whether the photo is the short range photo comprises determining whether the photo is the short range photo based on the lens information and a view angle determined according to the focal length information of the photo; and
the lens information is information about a lens used to take the photo.

7. The method of claim 1, wherein the adjusting of the photo further comprises adjusting the photo to be displayed throughout the screen if the photo is a long range photo.

8. The method of claim 7, wherein the adjusting of the photo comprises, if the photo is displayed while being inscribed in the screen, filling a remaining portion of the screen excluding the photo with an image obtained by copying at least a part of the photo.

9. The method of claim 8, wherein the filling of the remaining portion comprises filling the remaining portion with a background identical to a peripheral portion of the photo.

10. The method of claim 1, wherein the adjusting of the photo further comprises zooming in the photo so that a region having the focus information in the photo is located in a center of the screen, if the photo is the short range photo according to the determining.

11. The method of claim 1, wherein the screen is an image viewing region having the second shape in a display device, the second shape being different from the first shape or equivalent to the first shape.

12. The method of claim 1, wherein the second shape is a non-tetragonal shape.

13. A non-transitory computer readable recording medium having recorded thereon a program executable by a computer for performing the method of claim 1.

14. An apparatus for displaying a photo on a screen, the apparatus comprising:
an image extractor configured to extract photographing information about an individual photo having a first shape, wherein the photographing information comprises information for determining an important region in the individual photo, wherein the photographing information comprises at least one of lens information, focal length information, and focus information;
an image processor configured to determine whether the photo is a short range photo based on the photographing information and automatically adjust the individual photo for display with a shape corresponding to a screen having a second shape so as to display the important region in the screen, based on the extracted photographing information and whether the photo is a short range photo, wherein the second shape is different from the first shape, and if the first shape is rectangular, then the second shape is not rectangular; and
a displayer configured to display the adjusted photo on the screen.

15. The apparatus of claim 14, further comprising:
a storage unit configured to generate, using a digital photographing device, a digital photo file from the photo having the first shape, and store the generated digital photo file,
wherein the image extractor obtains the photographing information from the digital photo file.

16. The apparatus of claim 14, wherein the image processor determines a region having the focus information in the photo, and determines whether the photo is the short range photo based on the determined region.

17. The apparatus of claim 16, wherein the image processor determines that the photo is a long range photo if the focus information is distributed throughout the photo, and determines that the photo is the short range photo if the focus information is limited to a partial region of the photo.

18. The apparatus of claim 14, wherein:
the image processor determines whether the photo is the short range photo based on lens information and a view angle determined according to the focal length information of the photo; and
the lens information is information about a lens used to take the photo.

19. The apparatus of claim 14, wherein the image processor adjusts the photo to be displayed throughout the screen if the photo is a long range photo.

20. The apparatus of claim 19, wherein, if the photo is displayed while being inscribed in the screen, the image processor fills a remaining portion of the screen excluding the photo with an image obtained by copying at least a part of the photo.

21. The apparatus of claim 20, wherein the image processor fills the remaining portion with a background identical to a peripheral portion of the photo.

22. The apparatus of claim 14, wherein the image processor zooms in the photo so that a region having the focus information in the photo is located in a center of the screen, if the photo is the short range photo according to the determining.

23. The apparatus of claim 14, wherein the screen is an image viewing region having the second shape in the displayer, the second shape being different from the first shape or equivalent to the first shape.

24. An apparatus for processing a photo for display on a screen, the apparatus comprising:
a determiner configured to determine photographing information about an individual photo having a first shape, wherein the photographing information comprises information for determining an important region in the individual photo, wherein the photographing information comprises at least one of lens information, focal length information, and focus information;

an image processor configured to determine whether the photo is a short range photo based on the photographing information and automatically adjust the individual photo for display with a shape corresponding to a screen having a second shape so as to display the important region in the screen, based on the determined photographing information and whether the photo is a short range photo, wherein the second shape is different from the first shape, and if the first shape is rectangular, then the second shape is not rectangular; and an output unit configured to output the adjusted photo.

* * * * *